Feb. 3, 1959     A. TACKE ET AL     2,871,682
FLEXIBLE SHAFT COUPLING
Filed March 26, 1956
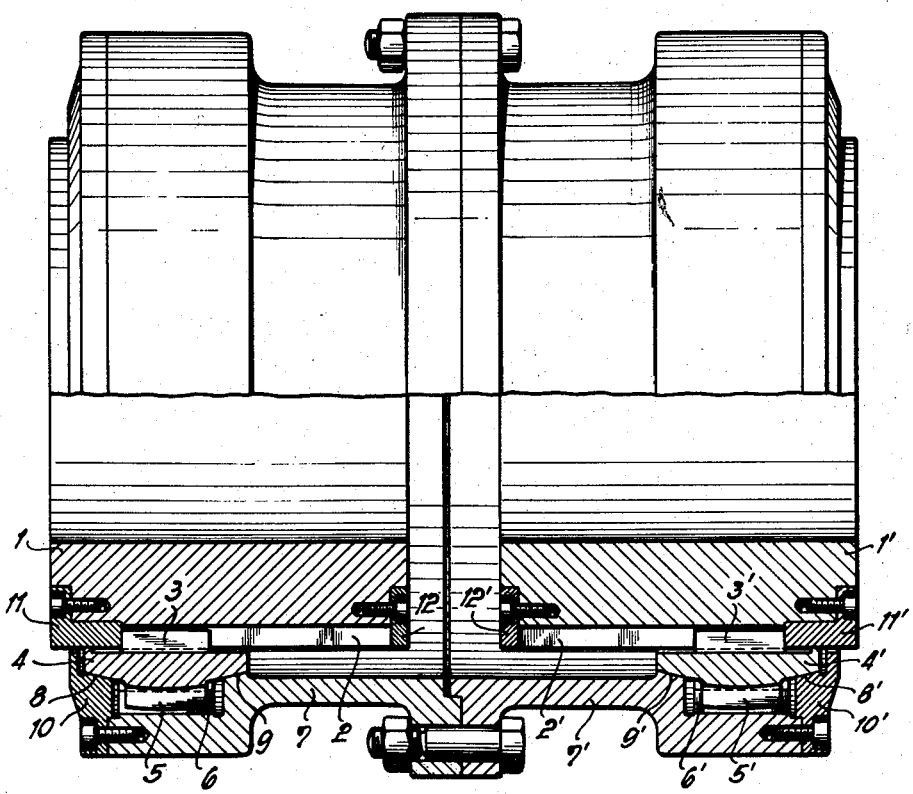
INVENTORS
A. Tacke and K. Haneklaus
by
Richard y. Geier
ATTORNEYS 2,871,682

FLEXIBLE SHAFT COUPLING

Albert Tacke and Karl Haneklaus, Rhine, Westphalia, Germany

Application March 26, 1956, Serial No. 573,667

Claims priority, application Germany March 25, 1955

6 Claims. (Cl. 64—9)

This invention relates to a flexible shaft coupling to connect the adjacent ends of a driving and driven shaft, and to compensate for misalignment of said shafts.

Heretofore, couplings of the type referred to, comprise hubs secured to the contiguous ends of the driving and driven shaft and an enclosing sleeve or casing for said hubs. Between the sleeve and the shaft hubs a toothed connection is ordinarily provided to impart motion from one to the other. This construction of couplings is required to leave a relatively wide play between the external toothing system of the hubs and the internal sleeve toothing system to allow the sleeve teeth to incline against the respective axis of either shaft when the shafts are parallelly or angularly misalined against each other, which movement results in an angular gearing of the corresponding hub and sleeve toothings of either shaft end, in which one portion of the sleeve teeth is in close cooperation and the other portion forms a slight gap with the corresponding hub teeth. At the same time and in addition thereto, these types of couplings are to compensate for strenuous axial displacements of the shaft ends. During this displacement the torque is transmitted from the driving shaft through the teeth of its hub to only that tooth portion of the sleeve teeth, which is engaged in close cooperation with the hub teeth. The consequent effect of such displacement of the shafts is that couplings of the above described manner are liable to rapid wear and create relatively strong frictional resistance during rotation of the shafts.

The main object of the invention is to provide an improved flexible shaft coupling of the general type specified, which will eliminate the above mentioned disadvantages and compensate for axial, parallel and angular displacements of the driving or driven shafts. More specifically, the invention contemplates a flexible coupling provided with two separate pairs of cooperating external and internal toothing systems at either shaft end in the coupling, one of which being adapted to allow axial displacement and the other being adapted to permit parallel and angular misalignments of the shafts.

Another object is to provide an annular member between the toothed hub and sleeve of the coupling, which member is toothed at its internal and external sides. This ring, with its internal toothing, cooperates with the hub toothing, and with its external toothing cooperates with the sleeve toothing of the coupling. In this construction a play is provided between the external teeth of the ring and the teeth of the sleeve to compensate for angular misalignment of the shaft, whereas the internal teeth of the ring cooperated with the hub teeth in sliding fit to meet axial displacement of the shaft.

An additional object of the invention is to provide a coupling adapted for use as a double articulation.

Other objects and features of the invention will appear from the following detailed description and the accompanying drawing, in which as one embodiment of the invention a double joint flexible coupling is represented in a longitudinal section.

The hubs 1, 1' are rigidly secured to the ends of two adjacent shafts and provided with a circumferential row of external teeth 2, 2', which teeth nearly have the axial width of the hubs 1, 1' and are adapted to mesh with a circumferential row of internal teeth 3, 3' formed in the interior of rings 4, 4', and being of smaller axial width than the hub teeth 2. The rings 4, 4' further have a circumferential row of convexed external teeth 5, 5', the latter cooperating with cylindric internal teeth 6, 6' formed in the interior and at each end of the sleeves 7, 7'.

The rings 4, 4' are of an axial width which is larger than the width of their teeth 3, 5 and 3', 5' and at both their sides, they are provided with spherical surfaces 8, 9 and 8', 9'. A concaved supporting shoulder of the sleeves 7, 7' is located adjacent to the ball-shaped surfaces 9, 9', and the sides surfaces 8, 8' of the rings 4, 4' give support to annular caps 10, 10' of the housing, which are screwed to the ends of the sleeves 7, 7'. The exteral faces of the teeth 2, 2' of the hubs 1, 1' are closed by means of rings 11, 11', which are screwed to the frontal ends of the hubs 1, 1', whereas the inner faces of the teeth 2, 2' are protected by rings 12, 12', which rings at the same time serve to limit the axial displacement of the driving and driven shaft, to which the hubs 1, 1' are secured.

The internal teeth 3, 3' of the rings 4, 4' are in sliding fit and gear with the straight teeth 2, 2' of the hubs 1, 1', thus in nearly playless operation they allow axial displacement of both the shafts, whereas the convex external teeth 5, 5' of the rings 4, 4' in cooperation with the internal toothings 6, 6' of the sleeves 7, 7' compensate for angular and parallel misalignments of the shafts. During these latter misalignments the rings 4, 4' by their internal teeth 3, 3', which gear into the teeth 2, 2' of the hubs, are retained in their axial positions parallel to their corresponding shafts, whereby jamming of the teeth 3, 3' in the teeth 2, 2' of the hubs is eliminated.

In the embodiment shown in the accompanying drawing and described hereabove the coupling is of the double joint type. The construction may, however, be simplified into a single joint coupling, in which case one shaft is connected with the hub 1 and the other with the sleeve 7 of the coupling. This type of single joint coupling is appliable only for angular and axial misalignment of the shafts, parallel displacement being excluded.

The straight teeth compensating for axial displacement of the shafts may be arranged at the hubs as well as in the interior of the sleeves of the coupling. In this modification the teeth for parallel and angular misalignment are located to operate between the rings and hubs of the coupling, the teeth of the hubs preferably being of convex shape.

It has been experienced that couplings according to the invention have an increased strain capacity, which results in improved transmission of torque from the driving to the driven shaft. In particular, the frictional resistance of the cooperating external hub and internal ring teeth for axial displacements is diminished to a large extent since tilting of the teeth is eliminated. The axial thrust is decreased to a minimum in this construction, so that shafts and bearings of the machines thus connected with each other and the coupling itself are granted longer useful life-time.

The construction may be modified in that the cooperating teeth compensating for angular and parallel misalignments are formed by the internal ring and hub teeth, and axial displacement is compensated by the cooperating external ring and sleeve teeth.

A further modified realisation of the spirit of the invention is to locate the teeth adapted to compensate for axial displacements at one part of the coupling only, for instance at the hub of one shaft, whereas the teeth compensating for angular and parallel misalignments are arranged at both parts of the coupling. In this modification the intermediate toothed ring is provided in only that part of the coupling which compensates for axial displacements. The part of the coupling, in which the intermediate ring is left out, in consequence thereof comprises only a hub-and-sleeve toothing system to compensate for angular and parallel misalignments.

Having thus described the invention, it should be understood that certain changes may be made in the construction and arrangement of parts without departing from the spirit and scope of the invention.

Our claims are:

1. A flexible shaft coupling comprising a pair of hub members having external teeth, a sleeve member having internal teeth and enclosing the hub member, an annular member between said hub and sleeve members and having internal teeth meshing with the external teeth of said hub members, and external teeth meshing with the internal teeth of said sleeve member, spherical surfaces on the external sides of said annular member, concaved shoulders formed at the internal side of the sleeve member and engaging the spherical surfaces of the annular member, adapted to compensate for axial thrust.

2. A flexible shaft coupling compensating for parallel, angular and axial displacement of shafts, said coupling comprising at least one hub, at least one sleeve enclosing said hub, at least one intermediate ring located between said hub and said ring, a toothing between said hub and said ring and consisting of intermeshing external teeth upon said hub and internal teeth upon said ring, and another toothing between said ring and said sleeve and consisting of intermeshing external teeth upon said ring and internal teeth upon said sleeve, the teeth of one of said toothings intermeshing in sliding fit to allow for axial displacement, the teeth of the other one of said toothings intermeshing with play to compensate for angular and parallel misalinements and having interengaging curved surfaces to compensate for axial thrust.

3. A flexible shaft coupling compensating for parallel, angular and axial displacement of shafts, said coupling comprising at least one hub, at least one sleeve enclosing said hub, at least one intermediate ring located between said hub and said ring, a toothing between said hub and said ring and consisting of intermeshing external teeth upon said hub and internal teeth upon said ring, said internal teeth of the ring meshing in sliding fit with said teeth of the hub to allow axial displacement, and another toothing between said ring and said sleeve and consisting of intermeshing external teeth upon said ring and internal teeth upon said sleeve, said external teeth of the ring meshing with play with said teeth of the sleeve to compensate for angular and parallel misalinements, said ring having at least one external side surface of spherical shape, and said sleeve having a surface engaging said spherical surface to compensate for axial thrust.

4. A shaft coupling in accordance with claim 3, wherein said internal teeth of the ring are straight and have an axial width which is less than that of the teeth of the hub.

5. A shaft coupling in accordance with claim 3, wherein said external teeth of the ring have an axial width which is less than that of the teeth of the sleeve.

6. A shaft coupling in accordance with claim 3 wherein said external teeth of the ring are curved spherically to compensate for parallel and angular misalinements.

References Cited in the file of this patent

UNITED STATES PATENTS

| | | |
|---|---|---|
| 1,905,431 | Banner | Apr. 25, 1933 |
| 1,961,426 | Morgan | June 5, 1934 |
| 2,659,217 | Talbot | Nov. 17, 1953 |
| 2,769,323 | O'Malley | Nov. 6, 1956 |